United States Patent
Twitchen et al.

(10) Patent No.: US 10,012,769 B2
(45) Date of Patent: Jul. 3, 2018

(54) SYNTHETIC DIAMOND OPTICAL ELEMENTS

(71) Applicants: Element Six Technologies Limited, Oxfordshire (GB); Element Six N.V., Cuijk (NL)

(72) Inventors: Daniel Twitchen, Santa Clara, CA (US); Andrew Michael Bennett, Oxfordshire (GB); Yevgeny Vasilievich Anoikin, Santa Clara, CA (US); Hendrikus Gerardus Maria DeWit, Cuijk (NL)

( * ) Notice: Subject to any disclaimer, the term of this patent is extended or adjusted under 35 U.S.C. 154(b) by 297 days.

(21) Appl. No.: 14/771,139

(22) PCT Filed: Mar. 4, 2014

(86) PCT No.: PCT/EP2014/054183
§ 371 (c)(1),
(2) Date: Aug. 27, 2015

(87) PCT Pub. No.: WO2014/135544
PCT Pub. Date: Sep. 12, 2014

(65) Prior Publication Data
US 2016/0003981 A1    Jan. 7, 2016

Related U.S. Application Data

(60) Provisional application No. 61/773,581, filed on Mar. 6, 2013.

(30) Foreign Application Priority Data

Apr. 23, 2013 (GB) .................................... 1307321.8

(51) Int. Cl.
*C23C 16/01* (2006.01)
*G02B 1/02* (2006.01)
*G02B 1/118* (2015.01)

(52) U.S. Cl.
CPC ................ *G02B 1/02* (2013.01); *G02B 1/118* (2013.01)

(58) Field of Classification Search
CPC ........... C30B 25/02; C30B 29/04; G02B 1/02; G02B 3/04; G02B 3/08; G02B 5/1876
(Continued)

(56) References Cited

U.S. PATENT DOCUMENTS 5,334,342 A    8/1994  Harker et al.
5,625,638 A    4/1997  Trost
(Continued)

FOREIGN PATENT DOCUMENTS

EP    0718642 A1    6/1996
GB    2433737 A  *  7/2007  .............. C30B 25/02
(Continued)

OTHER PUBLICATIONS

Combined Search and Exam Report for GB1403804.6 dated Aug. 29, 2014.
(Continued)

*Primary Examiner* — William R Alexander
*Assistant Examiner* — Grant Gagnon
(74) *Attorney, Agent, or Firm* — Bryan Cave Leighton Paisner LLP

(57) ABSTRACT

An optical element comprising: synthetic diamond material; and an anti-reflective surface pattern formed directly in at least one surface of the synthetic diamond material, wherein the optical element has an absorption coefficient measured at room temperature of ≤0.5 cm$^{-1}$ at a wavelength of 10.6 μm, wherein the optical element has a reflectance at said at least one surface of no more than 2% at an operating wavelength of the optical element, and wherein the optical element has a laser induced damage threshold meeting one or both of the following characteristics: the laser induced damage thresh-
(Continued)

old is at least 30 Jcm$^{-2}$ measured using a pulsed laser at a wavelength of 10.6 μm with a pulse duration of 100 ns and a pulse repetition frequency in a range 1 to 10 Hz; and the laser induced damage threshold is at least 1 MW/cm$^2$ measured using a continuous wave laser at a wavelength of 10.6 μm.

15 Claims, 1 Drawing Sheet

(58) Field of Classification Search
USPC .......................................................... 359/356
See application file for complete search history.

(56) References Cited

U.S. PATENT DOCUMENTS

| | | | |
|---|---|---|---|
| 7,327,916 B2* | 2/2008 | Tanaka | B23K 26/0643 257/E21.311 |
| 9,660,141 B2* | 5/2017 | Koike | H01L 33/20 |
| 2010/0116197 A1* | 5/2010 | Godfried | C30B 25/02 117/89 |
| 2010/0275998 A1* | 11/2010 | Chang | F24J 2/085 136/259 |
| 2010/0309279 A1* | 12/2010 | Tamkin | B41J 2/45 347/225 |
| 2016/0003981 A1* | 1/2016 | Twitchen | G02B 1/02 359/601 |

FOREIGN PATENT DOCUMENTS

| | | |
|---|---|---|
| GB | 2497671 A | 6/2013 |
| JP | 1149596 A | 2/1999 |
| JP | 2002241193 A | 8/2002 |
| JP | 2006507204 A | 3/2006 |
| WO | 2011103630 A1 | 9/2011 |

OTHER PUBLICATIONS

International Search Report and Written Opinion for PCT/EP2014/054183 dated Jun. 2, 2014.
Karlsson, et al., "Diamond micro-optics: microlenses and antireflection structures surfaces for the infrared spectral region", vol. 11, No. 5, Jan. 2003, p. 502.
Hobbs, Douglas S., "Study of the Environment and optical durability of AR microstructures in Sapphire, ALON and Diamond", Proceedings of SPIE, vol. 7302, (2009), p. 1.
Delacroix, et al," Design manufacturing, and performance analysis of mid-infrared achromatic half-wave plates with diamond subwave length gratings", Applied Optics, vol. 51, No. 24, Aug. 20, 2012.
Kononenko, et al,"Formation of antireflective surface structures on diamond films by laser patterning", Applied Physics A: materials science & processing, (1999), pp. 99-102.
Denatale, et al,Fabrication and characterization of diamond moth eye antireflective surfaces on Ge, Journal of Applied Physics, vol. 71, No. 3, (1982), p. 1387.
Bennett, et al,CVD diamond for high power laser applications, proceedings of SPIE, vol. 8603, (Feb. 22, 2013), p. 1.
Hausmann et al,"Fabrication of Diamond Nanowires for Quantum Information Processing Applications", Diamond and Related Materials 19, (2010) p. 1.
Burek, et al,"Free-standing Mechanical and Photonic Nanostructures in Single-Crystal Diamond", Nano Letters, 2012, 12, pp. 6084-6089.
Karlsson, et al. "Transfer of continuous-relief diffractive structures into diamond by use of inductively coupled plasma dry etching", Optics Letters, vol. 26, (2001), pp. 1752-1754.
Karlsson, et al. "Fabrication and evaluation of a diamond diffractive fan-out element for high power lasers," Dept. of Materials Science, 11, (2003), pp. 191-198.
Search Report for GB1307321.8 dated Aug. 30, 2013.
UK IPO Exam Report for GB1403804.6 dated Apr. 5, 2016.

\* cited by examiner

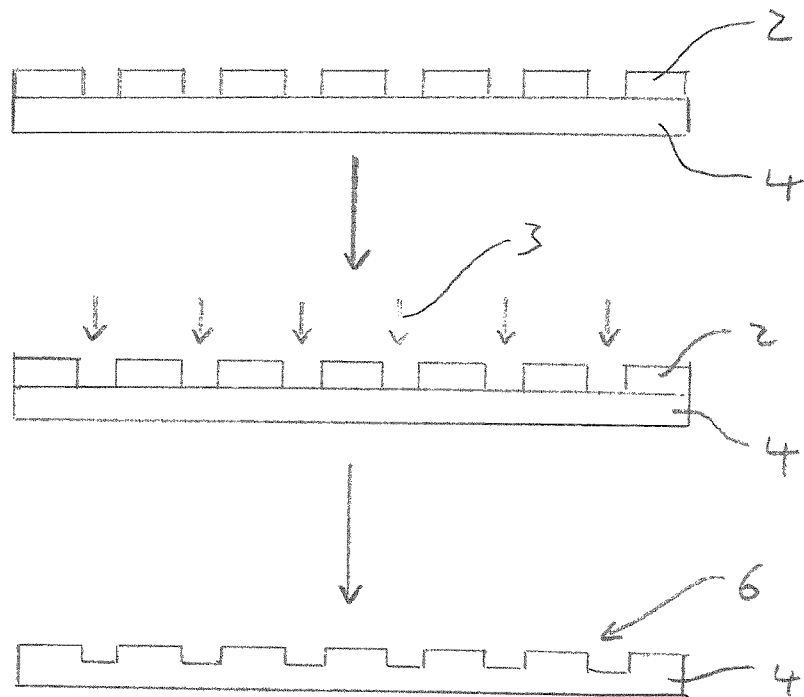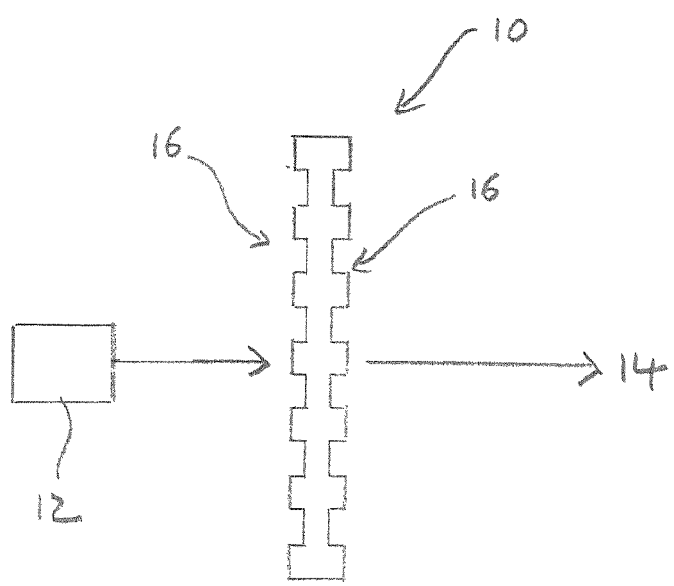

SYNTHETIC DIAMOND OPTICAL ELEMENTS

FIELD OF INVENTION

The present invention relates to synthetic diamond optical elements and particularly to the provision of an alternative to synthetic diamond optical elements comprising thin film anti-reflective coatings. Particular embodiments relate to synthetic diamond optical elements having optical, thermal, and mechanical characteristics suitable for high power optical applications although synthetic diamond optical elements as described herein may be used in other applications where the provision of an antireflective coating is undesirable due to factors including mechanical robustness, chemical inertness, low absorbance, and high thermal conductivity.

BACKGROUND OF INVENTION

Standard thin film anti-reflective coatings on synthetic diamond optical elements have excellent performance in terms of minimising reflection, but are limited in high power optical systems due to the ease with which they are damaged. Due to high absorbance and/or poor thermal conductivity the anti-reflective coating tends to be the weak point in any synthetic diamond window resulting in a synthetic diamond window with a low laser induced damage threshold (LIDT). Furthermore, even if the absorption level of a thin film anti-reflective coating is relatively low, the thin film can still fail in high power density optical applications. For example, for a 20 kW laser system damage of thin film anti-reflective coatings is problematic and current thin film anti-reflective coating solutions are unlikely to be compatible with laser systems operating at 40 kW or more. Such high power laser systems are desirable for a number of applications including laser produced plasma (LPP) extreme ultraviolet (EUV) lithography systems to drive integrated circuit processing to smaller dimensions. Such extreme optical applications will require a synthetic diamond window capable of handling extreme power densities and this will require the combination of: (1) a synthetic diamond material with the required dimensions and desired bulk optical characteristics including low optical reflectance/absorption/scatter; and; (2) an anti-reflective surface finish capable of handling extreme power densities. Thin film anti-reflective coatings can also be problematic in terms of their mechanical integrity, e.g. if subjected to scratching or abrasion.

As an alternative to thin film anti-reflective coatings, it is known that anti-reflective surface patterns such as moth-eye structures can be formed directly in the surface of an optical window material in order to provide an anti-reflective surface finish without the requirement of a coating. While such anti-reflective surface patterns have been successfully fabricated in a range of optical window materials, the application of this technology to synthetic diamond windows has proved problematic. The anti-reflective performance of such surface finishes has been variable due to the difficulty in processing precisely defined surface patterns into diamond material because of the extreme hardness and low toughness of diamond material. Furthermore, the processing methods required to form anti-reflective surface structures in diamond material have resulted in significant surface and sub-surface crystal damage being incorporated into the diamond material. This surface and sub-surface damage in the synthetic diamond window causes a number of inter-related detrimental effects including: (1) a reduction in the laser induced damage threshold of the synthetic diamond window; (2) a reduction in the power at which the synthetic diamond window can operate; and (3) a reduction in the optical performance of the synthetic diamond window as a result of beam aberrations caused by the surface and sub-surface damage. As such it would be desirable to develop a process which forms precisely defined anti-reflective surface structure into a synthetic diamond window without introducing surface and sub-surface crystal damage so as to achieve a synthetic diamond window which has a low absorbance, a low reflectance, a high laser induced damage threshold, and high optical performance with minimal beam aberrations on transmission through the synthetic diamond window. In addition, it would be desirable to provide a process which is low cost, compatible with existing materials processing, and scalable over large areas.

In relation to the above, a number of prior art documents have disclosed techniques for fabricating anti-reflective surface structure into diamond window materials as discussed below. However, it is believed that none of the prior art techniques have achieved the combination of features as identified above.

In "Materials for Infrared Windows and Domes" [Daniel Harris, published by The International Society for Optical Engineering, 1999] it is disclosed at section 6.1.1 that a moth eye surface structure can be formed directly in diamond material to reduce reflection. Here it is disclosed that such a surface structure can be fabricated by first etching a reverse moth eye structure into silicon by lithographic techniques and then growing diamond material on the etched surface by chemical vapour deposition. The silicon is then dissolved to leave the diamond material with a moth eye structure. It is described that a multi-layer structure including an outer diamond layer with a flat outer surface has a reflectance of about 18% at a wavelength of 10 μm, the reflectance being dominated by single-surface reflectance from the front face of the outer diamond layer (15%). When the flat diamond outer surface is replaced by a moth eye structure, reflectance is reduced to 7% at a wavelength of 10 μm.

One problem with this approach is that the reflectance is still relatively high and this is due to the fact that precisely defined anti-reflective structures cannot easily be achieved in diamond material by the technique of etching a reverse moth eye structure into a substrate and then growing diamond material on the etched surface by chemical vapour deposition. Furthermore, growth of diamond material on patterned substrates can lead to an increase in crystal defects such as dislocations within the diamond material which adversely affect the optical properties of the diamond material. Yet a further weakness of this approach is that the final optical element will inevitably include early stage nucleation diamond which has reduced thermal conductance and increased optical absorbance.

U.S. Pat. No. 5,334,342 discloses a similar method of fabricating moth-eye surface structures in diamond material by patterning a reverse moth eye structure into a substrate, growing diamond material on the patterned substrate, and then removing the substrate to leave the diamond material with a moth eye surface structure.

J. F. DeNatale et al [Fabrication and characterization of diamond moth eye antireflective surfaces on Germanium, J. Appl. Phys. 71, 1388 (1992)] have disclosed a similar approach by patterning a germanium substrate with a surface relief (moth eye) structure and then over-growing a thin diamond film on the patterned substrate such that the thin diamond film retains the underlying surface structure of the patterned substrate. It is described that the progressive gradation in the effective refractive index between air and the composite substrate has reduced Fresnel reflection losses to below 1%. This provides a means of overcoming the high refractive index and surface roughness considerations that often limit optical applications of polycrystalline diamond thin films. However, there is no disclosure of how to fabricate such moth-eye structures in free-standing diamond windows and although reflection losses have been reduced to below 1%, there is no disclosure of the laser induced damage threshold of the diamond material which will be sensitive to the quality of the diamond material. The quality of the diamond material in this instance will likely be poor as it is grown on a patterned germanium substrate.

T. V. Kononenko [Formation of antireflective surface structures on diamond films by laser patterning, Applied Physics A, January 1999, Volume 68, Issue 1, pp 99-102] discloses an alternative to the substrate patterning and diamond over-growth technique disclosed in the previously described prior art. This paper describes diamond surface microstructuring by a laser ablation technique. The optical transmission of the diamond films was found to increase from 70% to 80% at a wavelength of 10.6 µm by forming a microstructured surface by laser ablation.

Douglas Hobbs ["Study of the Environmental and Optical Durability of AR Microstructures in Sapphire, ALON, and Diamond", www.telaztec.com] has also reported the fabrication of moth eye anti-reflective surface microstructures directly in diamond material. It is reported that diamond windows with anti-reflective surface structures have been fabricated which have a transmittance of approximately 80% at a wavelength of 10 µm which compares with a value of approximately 70% for an untreated diamond window. These results appear similar to those reported by Kononenko using a laser ablation technique for patterning a diamond surface.

Hobbs also discloses that the anti-reflective microstructured diamond windows were tested for laser induced damage threshold using a pulsed $CO_2$ laser operating at 9.56 µm with a 100 ns pulse length and a pulse repetition frequency of 4 Hz. It is indicated that results of the tests were variable and inconsistent due to the nature of the diamond material but that the damage thresholds measured were in a range 50 to 100 $J/cm^2$, a level much higher than can be achieved with thin-film anti-reflective coatings.

Two key points may be noted from the Hobbs paper. First, the transmittance value of 80% is still rather low and this would indicate that the quality of the diamond material is relatively poor, the surface structures fabricated in the diamond windows are not precisely defined, or that significant surface or sub-surface damage has been introduced into the diamond crystal structure when forming anti-reflective surface micro-structures. Secondly, the paper does not indicate how the anti-reflective surface structures were fabricated in the diamond windows.

Previously described methods of fabricating anti-reflective surface structures in diamond windows have involved either substrate patterning and diamond overgrowth or direct patterning via laser ablation. An alternative technique is to directly etch anti-reflective surface structures into diamond windows. For example, various publications from Uppsala University in Sweden have focused on inductively coupled plasma etching of surface structures in diamond material including: M. Karlsson, K. Hjort, and F. Nikolajeff, "Transfer of continuous-relief diffractive structures into diamond by use of inductively coupled plasma dry etching", Optics Letters 26, 1752-1754 (2001); M. Karlsson, and F. Nikolajeff, "Fabrication and evaluation of a diamond diffractive fan-out element for high power lasers," Opt. Express 11, 191-198 (2003); and M. Karlsson, and F. Nikolajeff, "Diamond micro-optics: Microlenses and antireflection structured surfaces for the infrared spectral region," Opt. Express 11, 502-507 (2003).

The Uppsala group have indicated that diamond-based optics provide an attractive alternative for high-power laser optics due to their damage resistance, reduced thermal lensing, and transparency from the UV to the far-IR spectral regions. The Uppsala group have highlighted the need for better surface patterning for diamond-based optics and have proposed an inductively coupled plasma etching approach which involves patterning a resist layer on an optical-quality synthetic diamond using direct-write electron-beam lithography followed by dry etching in an inductively coupled plasma (ICP). The gases used for the diamond etching are $O_2$ and Ar and a typical ICP etch recipe is disclosed as comprising: gas flows of 7 sccm (standard cubic centimeters per minute) of $O_2$, and 8 sccm of Ar; a chamber pressure of 2.5 mTorr; an ICP power of 600 W; bias voltages varied between −100 and −180 V; and sample etch times of between 2 and 20 minutes.

It has been indicated that by correctly designing and fabricating sub-wavelength anti-reflective structures on both sides of a diamond window, it is possible to increase the transmission at a wavelength of 10.6 µm from 71% (unstructured diamond) to almost 97% (for microstructured diamond). It is indicated that this improvement in transmission is very important for high-power lasers, in which even a fraction of the scattered high optical power can lead to severe problems. Applications of this technology are described as including outcoupling windows for neodymium-doped yttrium aluminum garnet (Nd:YAG) or $CO_2$ lasers, satellite windows, and in x-ray optics. It is indicated that in these applications, it is mainly the high thermal conductivity, the high laser damage threshold, and the high wear resistance of the optical windows that are the driving factors.

Despite the above progress in fabricating anti-reflective surface structures into diamond windows, there is still a need to provide improved anti-reflective surface structures. It would be desirable to develop a process which forms precisely defined anti-reflective surface structure into a synthetic diamond window without introducing surface and sub-surface crystal damage so as to achieve a synthetic diamond window which has a low reflectance, a high laser induced damage threshold, and high optical performance with minimal beam aberrations on transmission through the synthetic diamond window. In this regard, while a number of prior art documents have disclosed techniques for fabricating anti-reflective surface structure into diamond window material as previously discussed, it is believed that none of the prior art techniques have achieved this desired combination of features. Furthermore, it has also been noted that a direct-write electron-beam lithography process for patterning of the resist prior to etching is time consuming and expensive.

In light of the above, it is an aim of embodiments of the present invention to provide a synthetic diamond optical element comprising an anti-reflective surface pattern formed directly in the surface of the synthetic diamond material and which has low absorbance and low reflectance while also having low surface and sub-surface crystal damage thus exhibiting a high laser induced damage threshold. It is a further aim to develop a technique for fabricating such anti-reflective surface patterns in diamond material which is relatively quick and low cost.

SUMMARY OF INVENTION

According to a first aspect of the present invention there is provided an optical element comprising:
synthetic diamond material; and
an anti-reflective surface pattern formed directly in at least one surface of the synthetic diamond material,
wherein the optical element has an absorption coefficient measured at room temperature of ≤0.5 cm$^{-1}$ at a wavelength of 10.6 μm,
wherein the optical element has a reflectance at said at least one surface of no more than 2% at an operating wavelength of the optical element, and
wherein the optical element has a laser induced damage threshold meeting one or both of the following characteristics:
the laser induced damage threshold is at least 30 Jcm$^{-2}$ measured using a pulsed laser at a wavelength of 10.6 μm with a pulse duration of 100 ns and a pulse repetition frequency in a range 1 to 10 Hz; and
the laser induced damage threshold is at least 1 MW/cm$^2$ measured using a continuous wave laser at a wavelength of 10.6 μm.

According to a second aspect of the present invention there is provided an optical system comprising:
an optical element as defined above; and
a light source configured to generate light at a power of at least 20 kW and transmit said light through the optical element.

BRIEF DESCRIPTION OF THE DRAWINGS

For a better understanding of the present invention and to show how the same may be carried into effect, embodiments of the present invention will now be described by way of example only with reference to the accompanying drawings, in which:

FIG. 1 shows a schematic flow diagram of a method of fabricating an optical element comprising synthetic diamond material with an anti-reflective surface finish pattern formed directly in a surface of the synthetic diamond material; and FIG. 2 shows a schematic diagram of a high power laser system comprising a high power laser source and an optical element formed of synthetic diamond material with an anti-reflective surface pattern formed directly in a surface of the synthetic diamond material.

DETAILED DESCRIPTION

The present inventors have realized that recent developments in processing of high purity single crystal CVD diamond materials in the field of quantum sensing and quantum information processing can be transferred to the field of high power polycrystalline CVD diamond laser optics to solve the problems outlined in the background section of this specification and achieve the fabrication of synthetic diamond optical elements which have low reflectance and high transmittance while also having low surface and sub-surface crystal damage thus exhibiting a high laser induced damage threshold.

Research into the use of high purity single crystal CVD diamond materials in the field of quantum sensing and quantum information processing is focused on a particularly kind of point defect found within the diamond crystal lattice, namely the negatively changed nitrogen-vacancy defect (NV$^-$). The NV$^-$ defect has an electronic spin which can be manipulated to function as a quantum bit or alternatively as a quantum sensing element. The NV$^-$ defect can be optically excited, manipulated using microwaves, and emits fluorescent light which is characteristic of its electronic spin state.

One requirement for quantum sensing and quantum information processing applications is that the NV$^-$ electronic spin defect should have a long quantum coherence time and this requires the NV$^-$ electronic spin defect to be located in a highly pure diamond lattice environment which has a low concentration of crystal defects and low internal stress which can otherwise detrimentally reduce the quantum coherence time of the NV$^-$ electronic spin defects disposed within the diamond crystal lattice. Another requirement for quantum sensing and quantum information processing applications is that the fluorescent light emitted from the NV$^-$ electronic spin defects needs to be efficiently out-coupled from the diamond material to a suitable processor or detector configuration and in this regard it is desirable to fabricate nanowires, optical waveguide structures, and photonic cavity structures into the diamond material in order to effectively out-couple photons emitted from the NV$^-$ electronic spin defects. Inductively coupled plasma etching (similar to that used by Uppsala University and discussed previously in the background section of this specification) has been used to fabricate such optical structures. However, it has been found that fabrication processes tend to introduce surface and sub-surface damage into the diamond crystal structure which adversely effects the quantum coherence time of the near-surface NV$^-$ electronic spin defects coupled to the optical surface structures. Furthermore, it has been found that the quality of the desired surface structures and the formation of unwanted etch grass between the desired surface structures is sensitive to the type of etch mask used and to the etch conditions. As such, recent work by groups developing structures for diamond quantum devices has focused on refining the inductively coupled plasma (ICP) etching process in order to allow fabrication of optical out-coupling structures for near-surface NV$^-$ electronic spin defects without introducing significant quantities of surface and sub-surface damage into the diamond crystal structure while at the same time achieving well defined optical structures in the diamond surface without unwanted etch grass disposed between the structures. This work is described in a number of publications including: B. Hausmann et al, Fabrication of diamond nanowires for quantum information processing applications, Diamond and Related Materials 19, 621-629 (2010); M. Burek et al., Free-standing mechanical and photonic nanostructures in single crystal diamond, Nano Lett. 2012; and US2001/0309265.

Groups developing structures for diamond quantum devices have experimented with a variety of different combinations of gas flow rates, ICP powers, and pressures for fabricating optical out-coupling structures in single crystal CVD diamond material without introducing significant quantities of surface and sub-surface damage into the diamond crystal structure. For example, the following inductively coupled plasma reactive ion etching (ICP RIE) recipe is reported in the literature as being suitable for this purpose: an oxygen etchant which has an oxygen gas flow of between 30 to 50 sccm O$_2$, a chamber pressure of approximately 10 mTorr, and an ICP power of approximately 700 W. It is reported that this etch recipe allows the formation of very well defined surface structures while avoiding the formation of etch grass between the desired surface structures. In addition, it is reported that the shape and quantity of the etched optical structures in a diamond surface can be controlled by varying the ICP power during the etching process. For example, in the fabrication of nano-wires in the surface of single crystal CVD diamond material a multi-step ICP RIE process is reported including applying an ICP power of 700 W for two minutes, an ICP power of 600 W for three minutes, and an ICP power of 1000 W for five minutes. Further still, a number of different etch masks are reported in the diamond quantum device literature including $Al_2O_3$ particles, Au particles, $SiO_2$ particles, evaporated Au, and FOx e-beam resist.

In light of the above, it is evident that groups developing structures for diamond quantum devices based on defects in the diamond lattice have successfully developed an ICP RIE process which is capable of forming well defined surface structures in diamond material without forming unwanted etch grass between such structures and without introducing a large amount of surface and sub-surface crystal damage. This technology has been developed specifically for efficiently out-coupling fluorescent light emitted from the $NV^-$ electronic spin defects in quantum sensing and quantum information processing applications including the formation of nanowires, optical waveguide structures, and photonic cavity structures into the diamond material in order to effectively out-couple photons emitted from the $NV^-$ electronic spin defects.

The present inventors have realized that the requirements for out-coupling structures such as nanowires, optical waveguide structures, and photonic cavity structures in quantum sensing and quantum information processing applications are very similar to the requirements for the fabrication of better anti-reflective surface patterns in transmissive diamond windows suitable for high power laser applications. That is, the etching technology developed for quantum sensing and quantum information processing applications can be transferred into the field of transmissive optics to provide a synthetic diamond window for high power laser applications comprising an anti-reflective surface pattern, such as a moth-eye pattern, formed directly in the surface of the synthetic diamond window and which has low reflectance and high transmittance while also having low surface and sub-surface crystal damage thus exhibiting a high laser induced damage threshold. While the etching technology developed for quantum sensing and quantum information processing applications is utilized for etching nanowires, optical waveguide structures, and photonic cavity structures in single crystal CVD diamond material comprising fluorescent $NV^-$ defects, in accordance with embodiments of the present invention the etching technology is applied to low absorbance optical quality diamond material, such as high quality polycrystalline CVD diamond material, to fabricate low surface damage anti-reflective surface finishes, such as moth-eye structures, therein and thus produce optical elements having a combination of low absorbance, low reflectance, and a high laser induced damage threshold.

A method of fabricating an optical element is provided as illustrated in FIG. 1 which comprises:
 forming a patterned resist layer 2 on at least one surface of a synthetic diamond material 4;
 etching 3 the at least one surface of the synthetic diamond material 4 through the patterned resist layer 2; and
 removing the patterned resist layer to leave an anti-reflective surface pattern 6 formed directly in the at least one surface of the synthetic diamond material 4, wherein the etching comprises, for example, an inductively coupled plasma reactive ion etching (ICP RIE) process comprising an oxygen gas flow rate of between 20 to 50 sccm $O_2$, a chamber pressure of between 5 and 20 mTorr, and an ICP power of between 600 and 1100 W.

Optionally, the inductively coupled plasma reactive ion etching process comprises one or more of: an oxygen flow rate between 25 and 35 sccm $O_2$; a chamber pressure between 7 and 15 mTorr; and an ICP power between 700 and 1000 W. The inductively coupled plasma reactive ion etching process may also comprise multiple steps with different ICP powers to control the surface profile of the anti-reflective surface pattern. Furthermore, the patterned resist layer may be formed from one of: $Al_2O_3$ particles; Au particles; $SiO_2$ particles; evaporated Au; and FOx e-beam resist. In practice, the resist is selected to be tolerant to a controlled deep etch. For example, a resist may be selected to be compatible with the formation of surface etch features having a height equal to or greater than 2 µm, 4 µm, 6 µm, 8 µm, or 10 µm.

In addition to the above, it has been note that certain prior art approaches as described in the background section utilize a direct-write electron-beam lithography process for patterning of the resist prior to etching. This direct-write electron-beam lithography process can be somewhat time consuming and expensive. As such, according to one alternative option which may provide a faster and more cost effective route to patterning the resist layer, it is proposed that the patterned resist layer is formed using an interference lithography technique. Interference lithography techniques are already known in the art for forming moth eye antireflective structures in other materials. For example, Telaztec™ utilize this approach for fabricating moth eye antireflective structures in a range of materials. It is proposed here that such an interference lithography technique for patterning the resist may be combined with a low surface/sub-surface crystal damage etching technology as a route to providing a commercially viable way of fabricating diamond optical windows with low absorbance, low reflectance, and a high laser induced damage threshold for high power laser applications.

Applying the aforementioned methodology, one aspect of the present invention is an optical element comprising:
 synthetic diamond material; and
 an anti-reflective surface pattern formed directly in at least one surface of the synthetic diamond material,
 wherein the optical element has an absorption coefficient measured at room temperature of $\leq 0.5$ cm$^{-1}$, $\leq 0.4$ cm$^{-1}$, $\leq 0.3$ cm$^{-1}$, $\leq 0.2$ cm$^{-1}$, $\leq 0.1$ cm$^{-1}$, $\leq 0.07$ cm$^{-1}$ or $\leq 0.05$ cm$^{-1}$ cm at a wavelength of 10.6 µm,
 wherein the optical element has a reflectance at said at least one surface of no more than 2%, 1.5%, 1%, or 0.5% at an operating wavelength of the optical element, and
 wherein the optical element has a laser induced damage threshold meeting one or both of the following characteristics:
 the laser induced damage threshold is at least 30 Jcm$^{-2}$, 50 Jcm$^{-2}$, 75 Jcm$^{-2}$, 100 Jcm$^{-2}$, 150 Jcm$^{-2}$, or 200 Jcm$^{-2}$ measured using a pulsed laser at a wavelength of 10.6 µm with a pulse duration of 100 ns and a pulse repetition frequency in a range 1 to 10 Hz; and
 the laser induced damage threshold is at least 1 MW/cm$^2$, 5 MW/cm$^2$, 10 MW/cm$^2$, 20 MW/cm$^2$, or 50 MW/cm$^2$ measured using a continuous wave laser at a wavelength of 10.6 µm.

Absorbance, reflectance, and laser induced damage threshold of an optical element are readily measurable by those skilled in the art (for example, ISO 21254-2:2011 describes methods for measuring laser induced damage threshold while Sussmann et al. [Diamond and Related Materials, 3, 1173-117, 1994] describe the specific application of laser damage testing to CVD diamond windows).

It should be noted that reflectance for an optical element will be dependent on the operating wavelength and that the anti-reflective surface pattern will be designed to be optimized for a particular operating wavelength. It is known in the art how to optimize the design of an anti-reflective surface pattern for a particular operating wavelength. What is considered to be new here is the ability to provide the combination of low absorbance, low surface reflectance, and high laser induced damage threshold in a synthetic diamond material. Where the operating wavelength for an optical element is unknown, then a range of wavelengths can be tested to determine where reflectance is minimized and this will correspond to the operating wavelength for the purposes of the present specification. That said, optionally the operating wavelength is selected from one of: 10.6 µm; 1.06 µm; 532 nm; 355 nm; or 266 nm, with an operating wavelength of 10.6 µm being preferred for certain commercial applications.

A synthetic diamond optical element is provided which has low absorbance and low reflectance in combination with low surface damage and an increased laser induced damage threshold. This is considered to be a key combination of parameters for high power laser windows and other high power laser optics such as prisms and lenses. As such, the present invention is considered to be an enabling technology for high power laser systems. Furthermore, the present invention can be used in applications where the synthetic diamond optical element may be subjected to scratching or abrasion, e.g. in watch glass applications, by avoiding the requirement for a thin film coating on the synthetic diamond material which can be readily damaged.

Optionally, the optical element may also have one or more of the following characteristics:
  a transmittance of at least 97%, 98% or 99% at the operating frequency of the optical element;
  a total integrated scatter in a forward hemisphere no more than 2%, 1%, 0.5%, or 0.1% at the operating frequency of the optical element;
  a dielectric loss coefficient tan δ measured at room temperature at 145 GHz of $\leq 2\times 10^{-4}$, $\leq 10^{-4}$, $\leq 5\times 10^{-5}$, $\leq 10^{-5}$, $\leq 5\times 10^{-6}$, or $\leq 10^{-6}$;
  an average black spot density no greater than 5 $mm^{-2}$, 3 $mm^{-2}$, 1 $mm^{-2}$, 0.5 $mm^{-2}$, or 0.1 $mm^{-2}$;
  a black spot distribution such that there are no more than 5, 4, 3, 2, or 1 black spots within any 3 $mm^2$ area;
  an integrated absorbance per unit thickness of no more than 0.20 $cm^{-2}$, 0.15 $cm^{-2}$, 0.10 $cm^{-2}$, or 0.05 $cm^{-2}$, when measured with a corrected linear background in a range 2760 $cm^{-1}$ to 3030 $cm^{-1}$;
  a thermal conductivity of no less than 1800 $Wm^{-1}K^{-1}$, 1900 $Wm^{-1}K^{-1}$, 2000 $Wm^{-1}K^{-1}$, 2100 $Wm^{-1}K^{-1}$, or 2200 $Wm^{-1}K^{-1}$;
  a silicon concentration as measured by secondary ion mass spectrometry of no more than $10^{17}$ $cm^{-3}$, $5\times 10^{16}$ $cm^{-3}$, $10^{16}$ $cm^{-3}$, $5\times 10^{15}$ $cm^{-3}$, or $10^{15}$ $cm^{-3}$; and
  an oxygen terminated surface.

Such optical characteristics can be achieved by applying the patterning technology as described herein to high quality optical grades of synthetic diamond material, such as high quality optical grade polycrystalline CVD diamond available from Element Six Limited. It is also envisaged that the patterning technology may be applied to optical grade single crystal CVD diamond (also available from Element Six Limited) for certain optical applications. Advantageously, the optical element meets one or more of the optical characteristics as described herein over at least 50%, 60%, 70%, 80%, 90%, or 100% of the area of the surface of the diamond optical element on which the anti-reflective diffractive surface finish is formed. In this regard, diamond optical elements can be fabricated to relatively large areas. For example, synthetic diamond components can be fabricated to a have largest linear dimension of at least 10 mm, 20 mm, 40 mm, 60 mm, 80 mm, 100 mm, 120 mm, or 140 mm. Such synthetic diamond components may be fabricated with a thickness equal to or greater than 200 µm, 250 µm, 350 µm, 450 µm, 500 µm, 750 µm, 1000 µm, 1500 µm, or 2000 µm.

Advantageously, the synthetic diamond material is fabricated by growing to a target thickness greater than that required for the final optical element and then processing a nucleation face of the diamond material to remove early stage nucleation diamond. As indicated in the background section, one weakness of prior art approaches is that early stage nucleation diamond is incorporated into the final optical element leading to a reduction in thermal conductance and an increase in optical absorbance. By growing the synthetic diamond material to a target thickness greater than that required for the final optical element it is possible to remove early stage nucleation diamond and thus provide an optical element with higher thermal conductance and lower optical absorbance. Removal of early stage nucleation diamond will inevitably result in a slight reduction in the strength of the synthetic diamond material. However, manufacturers such as Element Six Limited are capable of fabricating thick wafers of synthetic diamond material, such as polycrystalline CVD diamond wafers, with a high tensile rupture strength which enables removal of early stage nucleation diamond while retaining sufficient mechanical strength for end applications. For example, the synthetic diamond material may have one or more of the following structural characteristics:
  a tensile rupture strength with a nucleation face of the synthetic diamond material in tension of: $\geq 760$ MPa×n for a thickness of 200 to 500 µm; $\geq 700$ MPa×n for a thickness of 500 to 750 µm; $\geq 650$ MPa×n for a thickness of 750 to 1000 µm; $\geq 600$ MPa×n for a thickness of 1000 to 1250 µm; $\geq 550$ MPa×n for a thickness of 1250 to 1500 µm; $\geq 500$ MPa×n for a thickness of 1500 to 1750 µm; $\geq 450$ MPa×n for a thickness of 1750 to 2000 µm; or $\geq 400$ MPa×n for a thickness of $\geq 2000$ µm, wherein multiplying factor n is 1.0, 1.1, 1.2, 1.4, 1.6, 1.8, or 2; and
  a tensile rupture strength with a growth face of the synthetic diamond material in tension of: $\geq 330$ MPa×n for a thickness of 200 to 500 µm; $\geq 300$ MPa×n for a thickness of 500 to 750 µm; $\geq 275$ MPa×n for a thickness of 750 to 1000 µm; $\geq 250$ MPa×n for a thickness of 1000 to 1250 µm; $\geq 225$ MPa×n for a thickness of 1250 to 1500 µm; $\geq 200$ MPa×n for a thickness of 1500 to 1750 µm; $\geq 175$ MPa×n for a thickness of 1750 to 2000 µm; or $\geq 150$ MPa×n for a thickness of $\geq 2000$ µm, wherein multiplying factor n is 1.0 1.1, 1.2, 1.4, 1.6, 1.8, or 2.

Such synthetic diamond material may be processed to a surface flatness $\leq 5$ µm, $\leq 4$ µm, $\leq 3$ µm, $\leq 2$ µm, $\leq 1$ µm, $\leq 0.5$ µm, $\leq 0.2$ µm, $\leq$ or 0.1 µm and/or a surface roughness $R_a$ no more than 200 nm, 150 nm, 100 nm, 80 nm, 60 nm, 40 nm, 20 nm, or 10 nm.

Further improvements to the thermal conductivity of the synthetic diamond material can be made by reducing the natural 1.1% $^{13}C$ content of the material. As such, the synthetic diamond material may comprise at least a portion which has a $^{13}$C content of less than 1.0%, 0.8%, 0.6%, 0.4%, 0.2%, 0.1%, 0.05%, or 0.01%. In this regard, it should be noted that isotopically purified carbon source gas is expensive. As such, rather than fabricate the entire optical element from isotopically purified diamond material it can be advantageous to only fabricate a portion of the optical element from isotopically purified diamond material. For example, one or more surface layers of the synthetic diamond material may be formed of isotopically purified diamond material with the interior bulk being fabricated using a higher $^{13}$C content, preferable natural abundance. In one particularly useful embodiment a surface layer comprising the anti-reflective surface pattern is formed of isotopically purified diamond material so as to increase the thermal conductivity of the anti-reflective surface pattern and thus reduce localized heating and increase the laser induced damage threshold of the anti-reflective surface pattern. An underlying portion of synthetic diamond material may then comprise a higher concentration of $^{13}$C, preferably natural abundance, to reduce synthesis costs.

The anti-reflective surface finish of the present invention may be formed over the majority of a surface of the synthetic diamond material, e.g. over at least 50%, 60%, 70%, 80%, 90%, or over the entire surface. As such, the anti-reflective diffractive surface finish can be formed over an area of at least 50 mm$^2$, 100 mm$^2$, 200 mm$^2$, 300 mm$^2$, 500 mm$^2$, 700 mm$^2$, 1000 mm$^2$, 1500 mm$^2$, 2000 mm$^2$, 3000 mm$^2$, 5000 mm$^2$, 7000 mm$^2$, 10000 mm$^2$, 15000 mm$^2$, or 20000 mm$^2$.

The surface which is patterned with the anti-reflective surface finish may, for example, form the major optical exit and/or entry face of a diamond window, lens or prism with a majority, or the entire, optical exit and/or entry face of the optical element being patterned with an anti-reflective diffractive surface finish. In some applications it may be desirable to leave an unpatterned portion around a peripheral region of the transmissive optical element for mounting the transmissive optical element. Optionally, the anti-reflective surface pattern is formed on at least two surfaces of the synthetic diamond material. For example, the anti-reflective diffractive surface finish can be formed on both the optical entry face and the optical exit face of the optical element, e.g. on opposing major faces of a diamond window. Alternatively, for certain optical elements low reflectance is only required on one surface of the optical element, e.g. a beam splitter where partial reflectance is required on one surface.

Optical elements fabricated from high quality optical grade synthetic diamond material and comprising an anti-reflective surface pattern as described herein are suitable for use in high power optical systems due to their low reflectance and high laser induced damage threshold. As such, according to another aspect of the present invention there is provided an optical system as illustrated in FIG. 2 comprising:

a synthetic diamond optical element 10 comprising an anti-reflective surface pattern as described herein; and
a light source 12 (e.g. a laser) configured to generate light 14 at a power of at least 20 kW, 25 kW, 30 kW, 35 kW, 40 kW, 45 kW, or 50 kW and transmit said light through the synthetic diamond optical element 10.

In relation to the above, it will be noted that the operating power of the described optical system is significantly lower that the previously defined continuous wave laser induced damage threshold of 1 MW/cm$^2$. However, it should be noted that to provide an optical element that has a long operating lifetime the laser induced damage threshold of the synthetic diamond optical element should be significantly higher than the operating power of the optical system.

In the illustrated embodiment of FIG. 2 the optical element 10 is in the form of a transmissive diamond window with an anti-reflective surface pattern 16 fabricated in both major faces of the window. It should be noted that while the anti-reflective surface pattern illustrated in FIGS. 1 and 2 has a rectangular form this is for illustrative purposes only. The etching technology as described herein is capable of generating a range of cross-sectional shapes and thus is it possible to tailor the profile of the anti-reflective surface structure in order to optimize transmission, reflection, and laser induced damage threshold parameters for a particular application requirement.

Optionally, the aforementioned optical system may also provide a cooling system for cooling the synthetic diamond optical element. In this regard, the present inventors have noted that Element Six's optical grade synthetic diamond material shows a large decrease in absorption at low temperatures. This effect is not seen to the same extent with certain other diamond materials.

In summary, it is believed that optical elements as described herein comprise the key combination of parameters for high power laser windows. As such, the present invention is considered to be an enabling technology for high power laser systems. Furthermore, it is also envisaged that optical elements as described herein may be used in broad band visible wavelength applications (e.g. watch faces) where anti-reflective surface finishes may be provided for their mechanical robustness relative to thin film coatings.

While this invention has been particularly shown and described with reference to preferred embodiments, it will be understood to those skilled in the art that various changes in form and detail may be made without departing from the scope of the invention as defined by the appendant claims.

The invention claimed is:

1. An optical element comprising:
   synthetic diamond material; and
   an anti-reflective surface pattern formed directly in at least one surface of the synthetic diamond material,
   wherein the optical element has an absorption coefficient measured at room temperature of ≤0.5 cm$^{-1}$ at a wavelength of 10.6 μm,
   wherein the optical element has a reflectance at said at least one surface of no more than 2% at an operating wavelength of the optical element, and
   wherein the optical element has a laser induced damage threshold meeting one or both of the following characteristics:
   the laser induced damage threshold is at least 30 Jcm$^{-2}$ measured using a pulsed laser at a wavelength of 10.6 μm with a pulse duration of 100 ns and a pulse repetition frequency in a range 1 to 10 Hz; and
   the laser induced damage threshold is at least 1 MW/cm$^2$ measured using a continuous wave laser at a wavelength of 10.6 μm; and
   the optical element has one or more of the following characteristics:
   an average black spot density no greater than 5 mm$^{-2}$, 3 mm$^{-2}$, 1 mm$^{-2}$, 0.5 mm$^{-2}$, or 0.1 mm$^{-2}$;
   a black spot distribution such that there are no more than 5, 4, 3, 2, or 1 black spots within any 3 mm$^2$ area.

2. An optical element according to claim 1, wherein the operating wavelength is selected from one of: 10.6 μm; 1.06 μm; 532 nm; 355 nm; or 266 nm.

3. An optical element according to claim 1, wherein the laser induced damage threshold is at least 50 Jcm$^{-2}$, 75 Jcm$^{-2}$, 100 Jcm$^{-2}$, 150 Jcm$^{-2}$, or 200 Jcm$^{-2}$ measured using said pulsed laser.

4. An optical element according to claim 1, wherein the laser induced damage threshold is at least 5 MW/cm$^2$, 10 MW/cm$^2$, 20 MW/cm$^2$, or 50 MW/cm$^2$ measured using said continuous wave laser.

5. An optical element according to claim 1, wherein the reflectance at said at least one surface is no more than 1.5%, 1%, or 0.5% at the operating wavelength of the optical element.

6. An optical element according to claim 1, wherein the optical element has a transmittance of at least 97%, 98% or 99% at the operating wavelength of the optical element.

7. An optical element according to claim 1, wherein the optical element has a total integrated scatter in a forward hemisphere no more than 2%, 1%, 0.5%, or 0.1% at the operating wavelength of the optical element.

8. An optical element according to claim 1, wherein the optical element has an absorption coefficient measured at room temperature of ≤0.4 cm$^{-1}$, ≤0.3 cm$^{-1}$, ≤0.2 cm$^{-1}$, ≤0.1 cm$^{-1}$, ≤0.07 cm$^{-1}$ or ≤0.05 cm$^{-1}$ at 10.6 μm.

9. An optical element according to claim 1, wherein the optical element has a dielectric loss coefficient tan δ measured at room temperature at 145 GHz of ≤2×10$^{-4}$, ≤10$^{-4}$, ≤5×10$^{-5}$, ≤10$^{-5}$, ≤5×10$^{-6}$, or ≤10$^{-6}$.

10. An optical element according to claim 1, wherein the optical element has one or more of the following characteristics:

an integrated absorbance per unit thickness of no more than 0.20 cm$^{-2}$, 0.15 cm$^{-2}$, 0.10 cm$^{-2}$, or 0.05 cm$^{-2}$, when measured with a corrected linear background in a range 2760 cm$^{-1}$ to 3030 cm$^{-1}$;

a thermal conductivity of no less than 1800 Wm$^{-1}$K$^{-1}$, 1900 Wm$^{-1}$K$^{-1}$, 2000 Wm$^{-1}$K$^{-1}$, 2100 Wm$^{-1}$K$^{-1}$, or 2200 Wm$^{-1}$K$^{-1}$; and a silicon concentration as measured by secondary ion mass spectrometry of no more than 10$^{17}$ cm$^{-3}$, 5×10$^{16}$ cm$^{-3}$, 10$^{16}$ cm$^{-3}$, 5×10$^{15}$ cm$^{-3}$, or 10$^{15}$ cm$^{-3}$.

11. An optical element according to claim 1, wherein the anti-reflective surface pattern is formed in at least one surface of the synthetic diamond material over an area of at least 50 mm$^2$, 100 mm$^2$, 200 mm$^2$, 300 mm$^2$, 500 mm$^2$, 700 mm$^2$, 1000 mm$^2$, 1500 mm$^2$, 2000 mm$^2$, 3000 mm$^2$, 5000 mm$^2$, 7000 mm$^2$, 10000 mm$^2$, 15000 mm$^2$, or 20000 mm$^2$.

12. An optical element according to claim 11, wherein the optical element meets the requirements defined in one or more of claims 1 to 14 over at least 50%, 60%, 70%, 80%, 90% or 100% of said area.

13. An optical system comprising:

an optical element according to claim 1; and a light source configured to generate light at a power of at least 20 kW and transmit said light through the optical element.

14. An optical system according to claim 13, wherein the light source is configured to generate light at a power of at least 25 kW, 30 kW, 35 kW, 40 kW, 45 kW, or 50 kW.

15. An optical system according to claim 13, further comprising a cooling system for cooling the optical element.

\* \* \* \* \*